J. H. CROWELL.
POULTRY SCRATCH GRAIN FEEDER.
APPLICATION FILED NOV. 1, 1911. RENEWED AUG. 6, 1913.
1,105,885.
Patented Aug. 4, 1914.
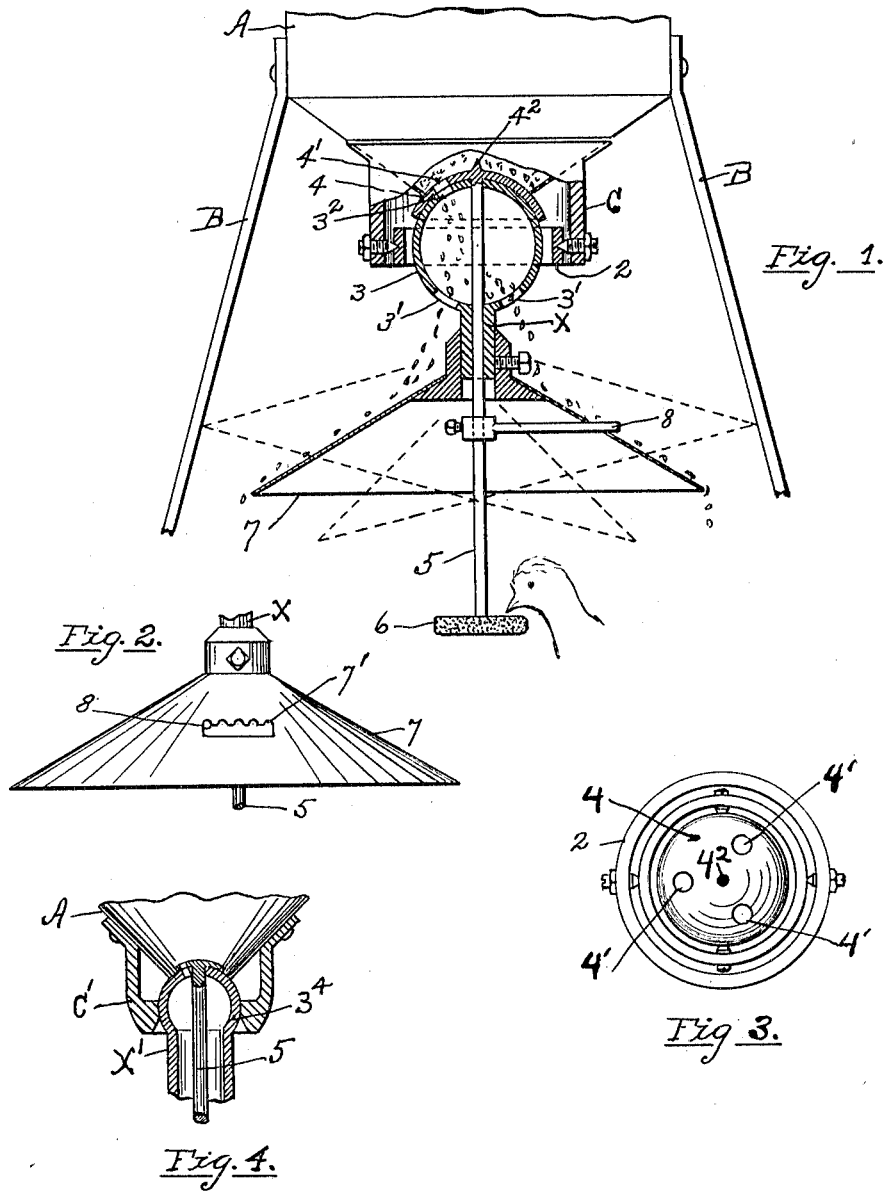

UNITED STATES PATENT OFFICE.

JOHN H. CROWELL, OF VINEYARD HAVEN, MASSACHUSETTS.

POULTRY SCRATCH GRAIN-FEEDER.

1,105,885.  Specification of Letters Patent.  Patented Aug. 4, 1914.

Application filed November 1, 1911, Serial No. 658,018. Renewed August 6, 1913. Serial No. 783,615.

*To all whom it may concern:*

Be it known that I, JOHN H. CROWELL, a citizen of the United States, residing at Vineyard Haven, in the county of Dukes and State of Massachusetts, have invented a new and useful Poultry Scratch Grain-Feeder, of which the following is a specification.

In practical poultry raising it has been found to be the better and more advantageous practice in feeding grain to the fowls to scatter it about on the ground so that the fowls will be compelled to run about and scratch for their feed and thus get the exercise deemed necessary for them.

The purpose of my invention is to provide an efficient scratch grain feeder which the fowls can easily operate to scatter the grain in all accessible directions, over a constantly varying radius. I accomplish these ends by the new and novel construction, combination and arrangement of parts hereinafter described, and illustrated in the accompanying drawings, in which:

Figure 1 is an elevation of my invention, the grain hopper and its supporting legs being partly broken away, and certain other parts shown in section. Fig. 2 is an elevation of my grain scattering member. Fig. 3 is a plan view illustrating one mode of mounting the scattering device for oscillating movement in any direction. Fig. 4 is a sectional view illustrating another mode of mounting the same.

Similar reference letters and numerals indicate like parts throughout the drawings.

In the drawings: A represents a grain container of any desired cross-section, and mounted at a proper height from the ground on supporting standards B. The bottom of said container is in the form of an inverted truncated cone open at its smaller end. To the bottom of the cone I secure an annular sleeve C which extends a distance above and below said smaller end. In said sleeve I mount a gimbal 2, in which in turn is mounted for oscillating movement in either direction a hollow sphere 3, provided with one or more perforations $3^2$ in its upper wall, and also with one or more similar perforations $3^1$ in its lower wall, said perforations being of adequate size for the passage freely therethrough of the grain or other feed contained in the chamber A. Interposed between the upper peripheral surface of the sphere 3 and the opening in the smaller end of the grain container I fit a concavo-convex semi-spherical disk 4, also provided with one or more perforations $4^1$ arranged and adapted to be brought into coincidence with the perforations $3^2$ in the sphere 3. Said disk 4 fits snugly into the smaller end opening and extends a distance therethrough into the container A, thus closing the opening, and furthermore, by reason of its spherical outline, serves to prevent lodgment of the grain upon it. One or more projections $4^2$ disposed on the surface of the disk 4 serve to stir the grain as the disk is oscillated in any direction.

The spherical globe 3 is provided with a diametrically extending sleeve X, preferably integral with its lower side and, diametrically opposite said sleeve, is perforated to permit the insertion therethrough and through said sleeve X of an actuating rod 5 secured to the disk 4 and arranged to turn freely in said sleeve X and said perforation in the upper part of the globe, and adapted to serve as means both for turning said disk 4 axially upon said globe to bring into coincidence, or vary the coincidence of, the perforations in said disk and in said globe, as well as to oscillate said disk and globe conjointly in any direction upon the gimbal support.

At the lower end of the rod 5 I secure a bait box 6. To the sleeve X I secure by a thumb screw or otherwise a cone-shaped grain scatterer 7 arranged for oscillating movement in any direction as actuated by said rod 5, and adapted to receive the grain as it falls through the perforations $3^1$ in the globe 3 and to scatter the grain over a considerable and constantly varying radius. It will be noted that as the cone 7 oscillates it will strike against the supporting standards B (of which only two are shown in the drawings) with the result that the grain will be prevented from sticking to the scatterer even though the latter may be wet or moist from exposure to the weather. A lever 8 secured to the rod 5 at any convenient point thereon, and operating in and through a serrated slot or rack $7^1$ in one side of said scatterer affords means for adjusting the perforations $4^1$ of the disk 4 relatively to the perforations $3^2$ of the globe 3 and for maintaining such adjustment, and for preventing undesired turning of the rod 5 in the globe 3 and its sleeve X. When the lever 8 is locked in the rack 7¹ the disk 4, globe 3, cone scatterer 7 and rod 5 are actuated unitedly and oscillatively as the fowl pecks at the bait box 6 (as it soon learns to do whether there is bait in the box or not) and the grains fall through the perforations in the disk and globe onto the scatterer and as the connected parts oscillate or swing in any direction the grain is scattered over the ground, not within a fixed radius but in an ever varying one.

In Fig. 4 I have shown a modification, or another form of my invention in which I dispense with the gimbal 2, and also with the perforations 3¹ in the lower wall of the globe 3, and enlarge the bore of the radially extending sleeve, as in X¹, so that the grain will fall through it onto the scatterer 7. I also in such case modify the sleeve C, as in C¹, so as to form with the member 3⁴ a ball and socket joint. The construction otherwise is the same as hereinbefore described, and the mode of operation and efficiency is the same as in the form of my invention first described.

I claim:

1. An automatic scratch grain feeder for poultry comprising a grain container having an opening in its base, a hollow spherical member provided with perforations in its upper wall and with openings in its lower wall, and mounted below said container opening for universal oscillatory movement, a concavo-convex disk interposed between said opening and spherical member and provided with perforations and arranged to close said container opening and for rotary movement therein to vary the registration of its perforations with those in said spherical member, and also arranged for united universal oscillatory movement of it and said spherical member, an actuating rod secured to said disk and extending therefrom through said spherical member and arranged for rotative movement to rotate said disk and also for oscillating movement in any direction for united universal oscillation of said disk and spherical member, a bait-box carried on said rod, a grain scattering member carried on said rod.

2. An automatic scratch grain feeder for poultry comprising a grain container having a discharge opening in its bottom, a concavo-convex perforated disk arranged to enter and close said discharge opening and for oscillation therein in all directions, a hollow member mounted below and in contact with said disk and provided with perforations in its upper wall adapted to register with said disk perforations, said disk arranged for rotation independently of said hollow member and also for united universal oscillation conjointly with said hollow member, means for independently rotating said disk, and means for the united universal oscillation of said disk and hollow member.

3. In a poultry scratch grain feeder having a grain container provided with a discharge opening in its base, a universally oscillative perforated disk closing and movable in said opening, and a universally oscillative perforated member registering with said disk and mounted below and supporting the latter for universal oscillation, the combination with said parts of an actuating rod secured to said disk, a conical grain scatterer carried on said member below said disk and provided with a serrated slot in its side wall, and a lever carried on said rod and arranged for adjustable engagement with said serrated slot.

JOHN H. CROWELL.

Witnesses:
HENRY MARSH, Jr.,
ARTHUR A. RHODES.